United States Patent [19]
Higuchi

[11] Patent Number: 5,662,881
[45] Date of Patent: Sep. 2, 1997

[54] APPARATUS AND METHOD FOR THE PRODUCTION OF ACTIVE MAGNESIUM HYDROXIDE

[75] Inventor: Akihiko Higuchi, Himeji, Japan

[73] Assignees: Daicel Abosisangyo Co., Hyogo; Kubota Tower Mill Corp., Tokyo, both of Japan

[21] Appl. No.: 143,115

[22] Filed: Oct. 29, 1993

[30] Foreign Application Priority Data

Oct. 29, 1992 [JP] Japan ................................ 4-316397

[51] Int. Cl.⁶ .............................................. C01F 5/16
[52] U.S. Cl. ............................................... 423/636
[58] Field of Search ....................................... 423/636

[56] References Cited

U.S. PATENT DOCUMENTS 3,836,627  9/1974  Wiensz ..................... 423/636

FOREIGN PATENT DOCUMENTS

| 241247 | 12/1986 | Germany . | |
|---|---|---|---|
| 272288 | 10/1989 | Germany . | |
| 3-197314 | 8/1991 | Japan .................... | 423/636 |
| 360774 | 9/1991 | Japan . | |

OTHER PUBLICATIONS

Patent Abstract of Japan, vol. 13, No. 208 (C–596) (3556) May 1989 re JP-A 1028214.
Patent Abstract of Japan, vol. 900 No. 219 (DW9013) Aug. 1988 re JP-A 2048414.
Patent Abstract of Japan, vol. 891 No. 128 (DW9002) Jan. 1988 re JP-A 1294520.

*Primary Examiner*—Michael Lewis
*Assistant Examiner*—Stuart L. Hendrickson
*Attorney, Agent, or Firm*—Cushman Darby & Cushman, L.L.P.

[57] ABSTRACT

Coarse light burned magnesia is comminuted in the wet state with a wet-pulverizer and hydrated in the presence of an alkaline aqueous medium at an elevated temperature of not less than 70° C., the resultant pulverizate is classified into fine and coarse particles using a classifying means, and the coarse particles are recycled to the wet-pulverizer. By subjecting light burned magnesia to concurrent wet-pulverization and hydration in the presence of a heated alkaline aqueous medium, the material magnesia can be simultaneously comminuted and hydrated under rapid heating. Therefore, from light burned magnesia, an active magnesium hydroxide showing a low viscosity even at a high concentration can be efficiently produced at a high rate in a fewer step.

12 Claims, 2 Drawing Sheets

APPARATUS AND METHOD FOR THE PRODUCTION OF ACTIVE MAGNESIUM HYDROXIDE

FIELD OF THE INVENTION

The present invention relates to an apparatus and method for producing active magnesium hydroxide of use as a neutralizer or desulfurizing agent from light burned magnesia.

BACKGROUND OF THE INVENTION

Magnesium hydroxide has been utilized in the desulfurization of flue gas and neutralization of effluent water. This hydrated magnesia is produced using sea water magnesium chloride as the starting material. However, the magnesium content of sea water is so low that the production process involves a complicated series of steps. Moreover, since a magnesium hydroxide Slurry is highly viscous even at a low concentration of about 30 weight %, the costs of production and transportation are high.

On the other hand, a process involving the hydration of light burned or calcined magnesia obtainable by burning naturally-occurring magnesite is known. Japanese Patent Publication No. 60774/1991, for instance, discloses a process for producing active magnesium hydroxide which comprises pulverizing calcined natural magnesite to provide powdery light burned magnesia and hydrating this magnesia with water at pH not less than 11 and an elevated temperature of not less than 85° C. In this process, the solubility in water and the rate of hydration of magnesia are so high that an active magnesium hydroxide exhibiting high rates of reaction with acidic substances can be obtained.

However, this process requires not only a protracted time for the pulverization of light magnesia but also requires a large-scale plant for mass production. Furthermore, in order to insure a sufficiently high hydration rate, it is necessary to finely divide light magnesia beforehand and classify the powder to the particle diameter of the order of about 1 to 30 µm. Moreover, fine particles prepared by such pulverization and classification operations contaminate the working environment, thus presenting safety and health problems. In addition, the particle size distribution of the resultant magnesium hydroxide is so broad, e.g. about 1 to 40 µm, that a quality-wise Uniform magnesium hydroxide is hardly obtained.

When exposed to moisture or water, fine particles of light magnesia tend to aggregate into blocks. Once blocks are formed, it is difficult to hydrate them uniformly in a short period of time.

Furthermore, since the production process involves pulverization, classification and hydration steps, the productivity can hardly be increased.

SUMMARY OF THE INVENTION

It is, therefore, a primary object of the invention to provide an apparatus and method for producing magnesium hydroxide of uniform quality by which light burned magnesia can be finely divided with ease in a short time without contaminating the working environment and be uniformly hydrated with good efficiency in a short time.

Another object of the invention is to provide an apparatus and method for producing active magnesium hydroxide which insures uniform and efficient hydration in a fewer step to yield active magnesium hydroxide having high activity.

It is a further object of the invention to provide an apparatus and method for producing an active magnesium hydroxide slurry showing a low viscosity even at a high concentration.

Taking note of the fact that compared with oxides such as light burned magnesia, hydroxides such as magnesium hydroxide are low in hardness and can, therefore, be easily pulverized, the inventor of the present invention did much research and found that when coarsely crushed light burned magnesia is wet-pulverized in the presence of water, it can be finely divided with high efficiency in a reduced time period to provide a powder with a sharp particle size profile without causing dust and caking problems. Particularly when the material magnesia is wet-pulverized in the presence of a heated alkaline aqueous medium, the pulverization and hydration of light burned magnesia proceeds fast to provide a slurry which is low in viscosity even at high concentration. The present invention has been completed on the basis of the above findings.

Thus, an apparatus of the invention for the production of active magnesium hydroxide comprises a wet-pulverizing means for comminuting light burned magnesia in the wet state and a reaction vessel for hydrating the resultant pulverized light burned magnesia in the presence of a heated alkaline aqueous medium.

Another production apparatus of the invention comprises a wet-pulverizing means for wet-comminuting light burned magnesia, supply means for feeding water and alkali to said wet-pulverizing means and a heating means for supplying a thermal energy to the reaction system within said wet-pulverizing means. This apparatus may further comprise a classification means and a recycling means for recycling pulverized particles in excess of a predetermined diameter to said wet-pulverizing means.

A process of the invention for producing active magnesium hydroxide comprises wet-pulverizing light burned magnesia and hydrating it in the presence of an alkaline aqueous medium at an elevated temperature of not less than 70° C. Another process of the invention comprises subjecting light burned magnesia to wet-pulverization verization and hydration in the presence of an alkaline aqueous medium at a temperature of not less than 70° C. This process may comprise adding alkali and light burned magnesia to water preheated to a temperature of not less than 70° C and subjecting the mixture to we pulverization and hydration.

DETAILED DESCRIPTION OF THE PREFERRED EMBODIMENTS

The present invention is now described in detail, with reference to the accompanying drawings where necessary.

Figure 1:
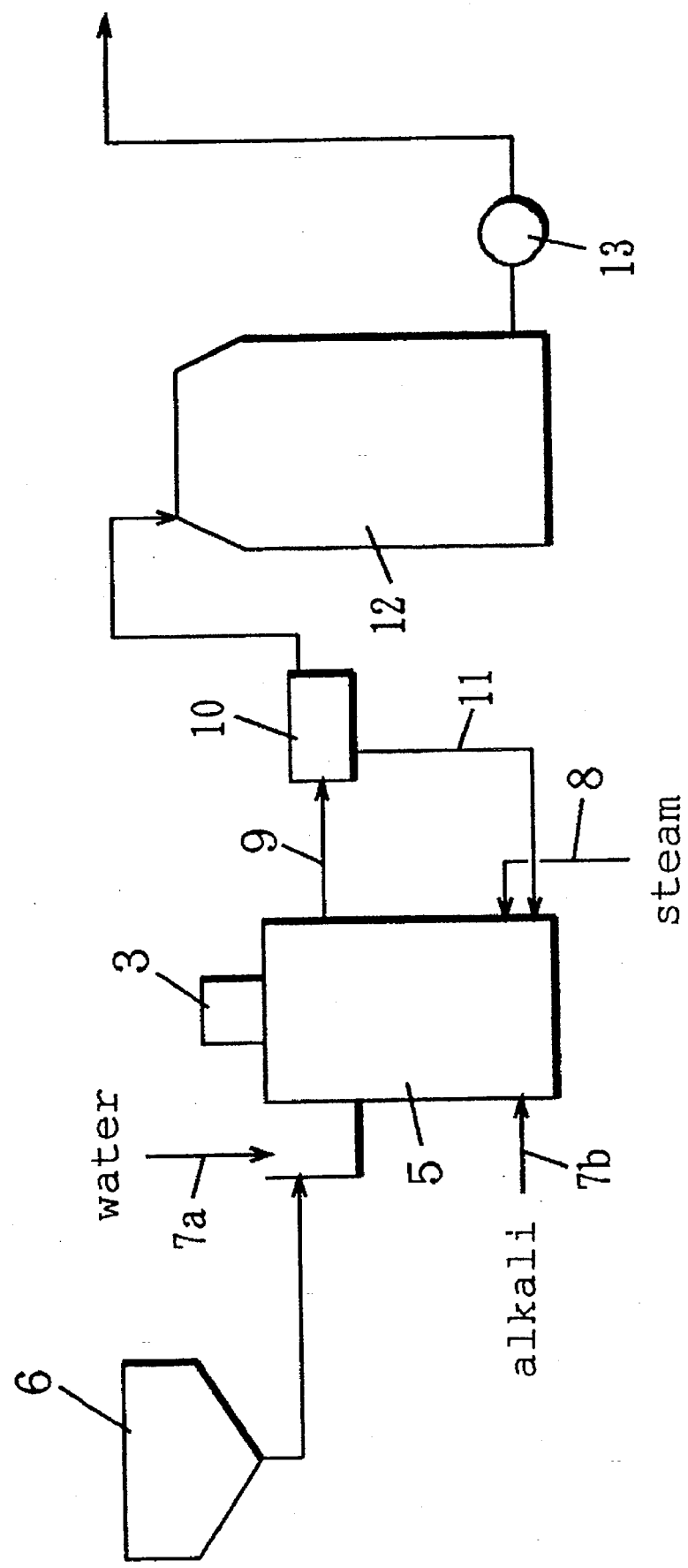
FIG. 1 is a schematic view illustrating an magnesium hydroxide production apparatus as an embodiment of the invention and FIG. 2 is a partially exploded view showing the wet-pulverizer of the equipment illustrated in FIG.
Figure 2:
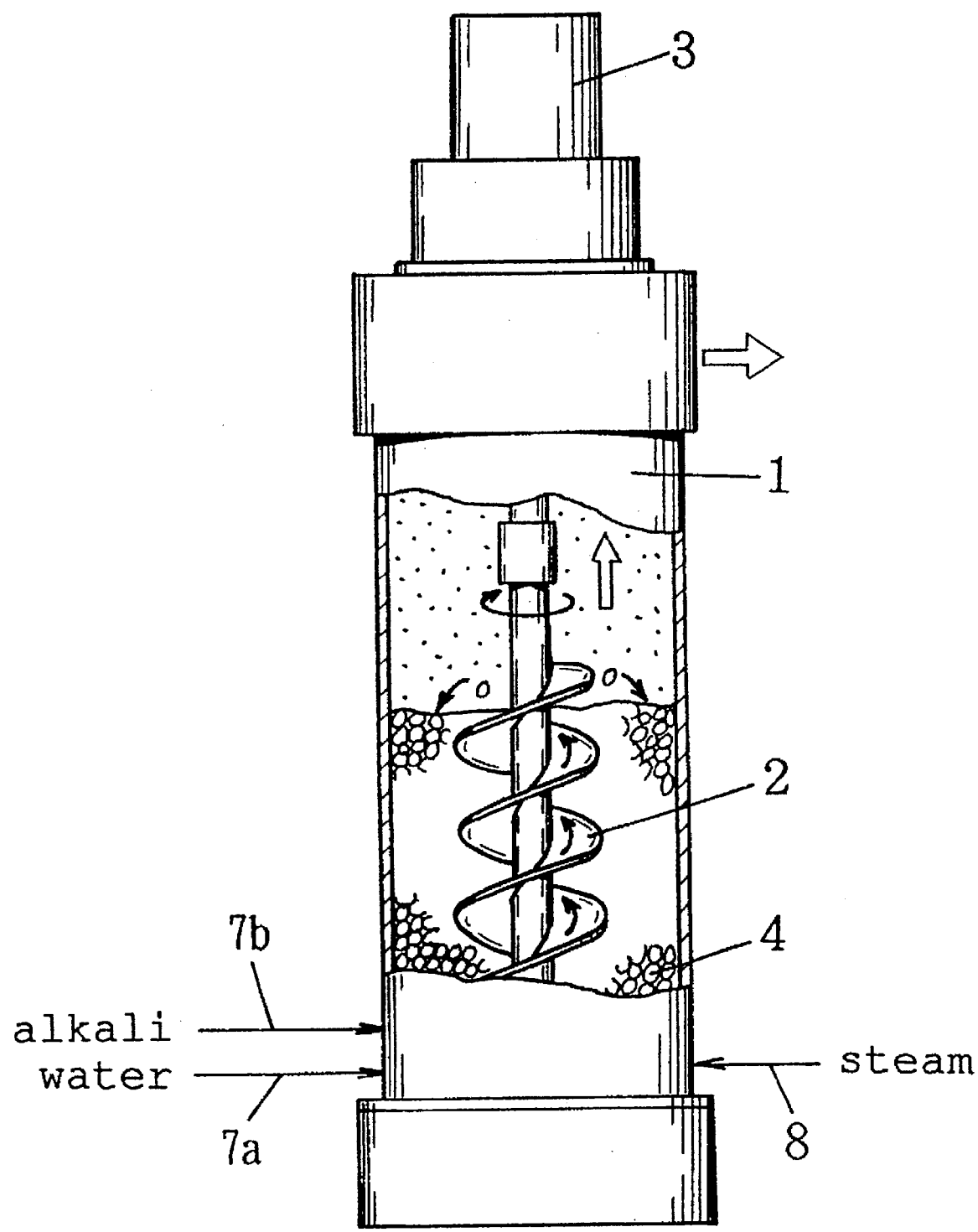

Referring to FIG. 1 which illustrates a production apparatus of the invention and FIG. 2 showing the wet-pulverizing means of the apparatus, the apparatus includes a wet-pulverizing means 5. As shown in FIG. 2, this wet-pulverizing means 5 comprises a casing 1, a screw 2 rotatably mounted within said casing, a motor 3 for driving said screw 2 and a crushing medium 4 accommodated in said casing 1. This wet-pulverizer 5 is supplied with coarse light burned or calcined magnesia from a hopper 6 at a predetermined rate.

For the wet-pulverization and hydration of light burned magnesia, the wet-pulverizer 5 is provided With a water supply line 7a, an alkali supply line 7b and a steam line 8 for feeding the steam necessary to elevate the internal temperature of the wet-pulverizer 5. Connected to the wet-pulverizer 5 at its upper level is a discharge line 9 for withdrawing a slurry containing the produced magnesium hydroxide particles.

For the size selection of magnesium hydroxide so pulverized and hydrated, said discharge line 9 is provided with a classifier 10. Furthermore, in order that comparatively coarse particles may be recycled to the wet-pulverizer 5, the classifier 10 is connected to the wet-pulverizer 5 through a recycle line 11. The slurry containing magnesium hydroxide particles size-selected by the classifier 10 is transferred to a ripening tank 12. The magnesium hydroxide slurry ripened in this ripening tank 12 is withdrawn by means of a pump 13.

As the screw 2 of the wet-pulverizer 5 revolves, the crushing medium 4 is driven by the blade of the screw 2 to ascend and the coarse light burned magnesia is finely divided in the process. Since the light burned magnesia can be pulverized while water and alkali are supplied from the supply lines 7a and 7b under heating with steam or the like, the hydration reaction also proceeds along with pulverization, so that a magnesium hydroxide slurry with a controlled particle diameter can be continuously produced with high efficiency in a short time.

The foregoing is explained in further detail, as light burned magnesia comes into contact with an aqueous alkali medium, the magnesia is hydrated to give magnesium hydroxide. This magnesium hydroxide is lower in hardness than the light burned magnesia. This is obvious if only from the fact that whereas the hardness of naturally-occurring magnesia (periclase) is about 5.5 to 6.5, the hardness of naturally-occurring magnesium hydroxide (brucite) is about 2.5. Moreover, since the cohesive force of particles is reduced in aqueous media, smooth pulverization can be obtained. As light burned magnesia is subjected to shearing forces during wet-pulverization, a high-concentration slurry containing magnesium hydroxide particles in a predetermined size range is produced with good efficiency. This is probably due to the concurrent attrition and pulverization of light burned magnesia, exfoliation and pulverization of surface magnesium hydroxide and constant surface renewal of the light burned magnesia particles.

Wet-pulverization and hydration characteristics of magnesia are different from those of burned lime (calcium oxide). Namely, the Mobs hardness of calcium oxide is about 4, and the reactivity of calcium oxide with water is higher than that of magnesia and calcium hydroxide is spontaneously produced with exothermic reaction in water. Therefore, the hydration of calcium oxide can be smoothly conducted, even without pulverization of calcium oxide, in water with self disintegration and high calorific value to produce fine particles of calcium hydroxide and, thus, for the hydration of calcium oxide, the dry-pulverization and wet-pulverization are not essentially required.

The number of revolutions of the screw and the peripheral speed of the blade may be suitably selected from a broad range which is not adversely affected on the wet-pulverization. The number of revolutions of the screw is, for example, about 30 to 500 rpm, preferably about 50 to 300 rpm and more preferably about 70 to 100 rpm. The peripheral speed of the blade is, for example, about 0.5 to 10 m/sec., preferably about 1 to 8 m/sec. and more preferably about 2 to 4 m/second.

In flue gas desulfurization or effluent water neutralization, magnesium hydroxide is generally commercially available in the form of a slurry of about 30 weight % concentration. Therefore, the magnesium hydroxide produced by the invention can be used as it is when the rate of water supply has been properly chosen. Since the pulverization occurs in the aqueous medium, the generation of dusts is precluded and there is no aggregation of particles, either.

Furthermore, the pulverization generates a heat of friction and the hydration gives a heat of reaction. Therefore, the heat of friction and the heat of reaction can be effectively utilized for hydration to promote the hydration reaction as well as the pulverization process, with the consequence that the consumption of steam and, hence, the energy cost can be de creased. For example, the heat of friction due to pulverization and the heat of hydration are sufficient to elevate the internal temperature of the wet-pulverizer to about 50 to 60° C. Moreover, because it is sufficient to crush light magnesia to a coarse degree, the energy required for preliminary comminution can be conserved.

The fine particles produced in the wet-pulverizer 5 are entrained by the ascending flow of the aqueous medium until they reach the discharge line 9. Therefore, there occurs some classification of particles within the wet-pulverizer 5. Moreover, even if coarse particles are contained in the slurry withdrawn through the discharge line 9, they are separated by the classifier 10 and recycled to the wet-pulverizer 5 through the recycle line 11. Therefore, a slurry of magnesium hydroxide in a given particle size range is pooled in the ripening tank 12. Even if the particles are not fully hydrated in the course from the wet-pulverizer 5 to the ripening tank 12, the particles are further hydrated in the ripening tank 12 and, therefore, there is no problem of insufficient hydration. Usually, light burned magnesia is finely comminuted as It is circulated several times within the wet-pulverizer 5.

The resultant slurry is characterized in that it is very low in viscosity even at high concentration. Thus, the magnesium hydroxide produced using sea-water magnesium as the raw material has a particle diameter of about 4 to 10 μm and its slurry viscosity is as high as about 1000 cps at a concentration of about 30 weight %. The magnesium hydroxide obtainable by hydrating a light burned magnesia in the size range of 1 to 30 μm (not more than 300 mesh) with water at an elevated temperature of 85° C. under pH conditions not less than pH 11 shows a broad particle size distribution of about 1 to 40 μm, with a mean diameter of generally about 10 to 15 μm, and its slurry viscosity is about 400 cps at 30 weight % concentration.

In contrast, the apparatus and method of the invention provide a magnesium hydroxide slurry with a viscosity of not more than 200 cps, particularly about 50 to 200 cps, at a concentration of about 30 weight %.

It is supposed that the shape of particles significantly affects on the slurry viscosity. Thus, observation of the magnesium hydroxide of the invention with a microscope reveals aggregates of fine particles not greater than 5 to 6 μm and a sharp particle size distribution of about 5 to 20 μm. The mean diameter of the aggregates of magnesium hydroxide particles is generally about 10 to 25 μm and preferably about 12 to 20 μm. Thus, even when the primary particles of magnesium hydroxide are small and occur in a high concentration, the slurry shows a very low viscosity. Furthermore, aggregated particles are ready to be redispersed by an external force so that fine primary particles of active magnesium hydroxide may take part in neutralization or desulfurization, thus contributing to the reaction.

Therefore, the magnesium hydroxide produced by the apparatus and method of the invention is superior in slurry fluidity and contributes to improved storage and pipeline transportation efficiencies. In addition, since its slurry viscosity is low, it can be provided as a thick slurry of about 50 weight % concentration, thus enabling marked reductions in transportation and storage costs.

The light burned magnesia which can be used is the magnesium oxide prepared by calcining naturally-occurring magnesite (periclase) at a temperature of about 550° to 1500° C., preferably about 650° to 1300° C. and more preferably at about 800° to 1200° C. Outside of the above calcining temperature range, the activity of magnesium hydroxide may not be as high as desired.

In practicing the invention, it is not necessary to finely comminute the light burned magnesia to any definite particle diameter beforehand. Thus, the particle size of light magnesia can be selected from a broad range which is acceptable for wet-pulverization. Thus, for example, coarse particles with a maximum diameter of not larger than 10 mm and a mean diameter of about 0.5 to 3 mm can be employed. In order to improve the pulverization efficiency, coarse-crushed light magnesia not larger than 10 mesh is frequently employed.

As the wet-pulverizing means, a variety of devices capable of continuous pulverization of light burned magnesia in aqueous medium, such as a sandmill, an attritor, etc., can be employed. Furthermore, the wet-pulverizer is not limited to a continuous pulverizer adapted to continuously comminute light calcined magnesia but can be a batch pulverizer such as a ball mill, a kneader or the like. As a preferred example of said continuous wet-pulverizer, Kubota Tower Mill (manufactured by Kubota, Co., Ltd.; Japan) can be mentioned. The continuous wet-pulverizer is disclosed in U.S. Pat. No. 4,269,808 as a vertical abrasion mill.

Different from the combination of dry-pulverization and hydration, the concurrent wet-pulverization and hydration by the wet-pulverizer can also efficiently produces fine particles of magnesium hydroxide, such as particle diameter of 0.5 to 2 µm, in accordance with controlling the pulverization time, the peripheral speed of blade and so on.

The heating means is not limited in type but should be a heating means capable of elevating the temperature of the reaction system to a level of not less than 70° C., preferably 85° to 120° C., more preferably 90° to 110° C. and particularly 95° to 105° C. When wet-pulverization is carried out in alkaline aqueous medium at such a temperature, the light calcined magnesia is finely divided while it reacts rapidly With the alkali so that, as mentioned above, a thick and yet low-viscosity slurry can be efficiently produced.

In practicing the present invention, it is not essential that the pulverization of coarse light calcined magnesia and hydration of the magnesia take place concurrently. Thus, an apparatus of the invention comprises a wet-pulverizing means for comminuting light calcined magnesia in the wet state and a reactor for hydrating the comminuted light calcined magnesia in the presence of a hot alkaline aqueous medium. The reactor of such apparatus is generally connected to a steam or other heat source. In this apparatus, the temperature of the wet-pulverizing system may be different from the temperature of the reaction system so far as the reaction system is heated. The structure of the reactor is not particularly limited, and a conventional reaction vessel such as an agitation tank equipped with stirring means can be employed.

The water and alkali may be supplied independently or in the form of an aqueous solution of the alkali. The alkali may also be supplied as an aqueous solution of high concentration. Thus, in many instances, the alkali is supplied as an aqueous solution of about 10 to 50 weight % concentration. Referring to the heating means, at least one member of light burned magnesia, water and alkali may be heated to establish the temperature of the reaction system but it is generally preferable to heat the water or aqueous solution of alkali, which is consumed in large quantities, beforehand. Expedient and rapid heating can be made by direct blowing of steam into the reaction system. Moreover, the water or aqueous solution of alkali may be pre-warmed and fed to the reaction system.

The classifying means may be a conventional classifier equipped with a screen means such as a wire-mesh screen and the proper sieve or mesh-size can be selected according to the desired particle size of magnesium hydroxide. The classifying means is generally set to restrict the passage of particles in excess of 20 µm.

One process of the present invention comprises a wet-pulverizing step for comminuting light burned magnesia under wet conditions and a hydration step at which the comminuted light magnesia is hydrated in the presence of an alkaline aqueous medium.

The pH of said alkaline aqueous medium can be selected within the range conducive to efficient hydration of light burned magnesia, thus being not less than 11, preferably not less than 11.5 and more preferably not less than 12. When the pH is less than 11, the hydration rate is inadequate and the yield of high-activity magnesium hydroxide is low.

The species of the alkali includes, for example, alkali metal hydroxides such as potassium hydroxide, sodium hydroxide, etc. Water is frequently used as the aqueous medium.

The ratio of water to light burned magnesia can be selected according to the thickness or concentration of the slurry. By way of illustration, 100 to 400 parts by weight, preferably 150 to 300 parts by weight, of water can be used per 100 parts by weight of light burned magnesia.

The amount of the alkali may be just sufficient to adjust the reaction system to the above-mentioned pH value. The required amount of alkali is dependent on the kind of alkali. When the alkali is sodium hydroxide, for instance, it can be used in a proportion of, for example, 0.75 to 1.25 parts by weight, preferably 0.9 to 1.1 parts by weight, per 100 parts by weight of light burned magnesia.

The reaction temperature in the hydration stage is not less than about 70° C., preferably about 85° to 120° C., more preferably in the range of about 90° C. to about 110° C., and particularly about 95° to 110° C. When the reaction temperature is below 70° C., the hydration rate tends to be decreased.

Furthermore, the hydration reaction is preferably carried out by feeding the wet-pulverizate of light burned magnesia continuously or intermittently to either water or an aqueous solution of alkali at a temperature of about 85° to 120° C., preferably about 90° to 110° C and more preferably about 95° to 110° C. so as to rapidly heat and hydrate the wet-pulverizate of light burned magnesia.

In the above process, the hydration time is generally about 45 minutes to 2 hours and preferably about 1 to 2 hours.

In another preferred process, coarse light burned magnesia is simultaneously wet-pulverized and hydrated in the presence of an alkaline aqueous medium. According to this procedure, light burned magnesia can be concurrently wet-pulverized and hydrated to provide an active magnesium hydroxide slurry, which is low in viscosity even at high concentrations, with high efficiency and in a short time. Moreover, compared with the conventional technology, the hydration reaction can be allowed to proceed smoothly even at a lower temperature.

It is particularly preferable that the wet-pulverization and hydration of light burned magnesia be caused to proceed rapidly at a high temperature. For this purpose, light burned magnesia is wet-pulverized in the presence of a heated alkaline aqueous medium at a temperature of not less than about 70° C., preferably about 85°–120° C., and more preferably about 95°–110° C.

In this preferred process, the alkali and light magnesia are added to water at a temperature of not less than 70° C. and wet-pulverized and hydrated in the water.

Compared with the conventional technology which requires about 2 to 3 hours for hydration, the concurrent wet-pulverization and hydration process of the invention provides a high-activity magnesium hydroxide slurry in a drastically reduced time. To be specific, when the wet-pulverization and hydration reaction are carried out on a continuous basis, an active magnesium hydroxide slurry begins to be produced in about 20 minutes after commencement of pulverization in the batch operation, too, an active magnesium slurry can be obtained in about 40 minutes. It should be understood that in order to obtain a finished active magnesium hydroxide, it is usually sufficient to continue the wet-pulverization and hydration reaction for a time not exceeding about 1 hour.

The slurry formed by the wet-pulverization and hydration reaction may be transferred to the ripening tank for completion of hydration. After the hydration reaction, the reaction mixture is generally cooled to provide a magnesium hydroxide slurry. The concentration of the magnesium hydroxide slurry can be controlled by adjusting the amount of water for the hydration reaction or the amount of water available in the ripening tank. The concentration of the magnesium hydroxide slurry may be controlled by dilution or concentration.

In the apparatus and method of the present invention, in which light burned magnesia is wet-pulverized, the material magnesia can be finely divided easily and in a short time without contamination of the working environment and, moreover, can be uniformly hydrated with good efficiency in a short time to provide a magnesium hydroxide of uniform quality. Moreover, when the wet-pulverization and hydration reaction are simultaneously carried out, the material magnesia can be rapidly and efficiently hydrated to provide a highly active magnesium hydroxide in a fewer step. In addition, when the wet-pulverization and hydration reaction are simultaneously carried out in this manner, an active magnesium hydroxide which is low in viscosity even at high concentrations can be efficiently produced.

The following examples and comparative example are merely intended to illustrate the present invention in further detail and should not be construed as defining the scope of the invention.

EXAMPLES

Example 1

A compact kneader (capacity 10 liters) equipped with jacket means on three sides was charged with 700 g of water and a steam was introduced into the jacket means at a pressure of 2.5 kg/cm$^2$ to heat the water to 90° C. Then, the kneader was further charged with 240 g of coarse light burned magnesia with a maximum grain diameter of not more than 10 mm and 2.4 g of sodium hydroxide and the mixture was kneaded under heating for 1 hour. The mixture was then cooled to provide a magnesium hydroxide slurry.

The resultant slurry showed a hydration rate of 97%, that is substantially thorough hydration and contained magnesium hydroxide particles with a mean diameter of 17 µm and a particle size distribution of 5 to 20 µm. Observation of the slurry particles using a microscope revealed aggregates of fine particles Sized about 5 µm. As measured with a B-type viscosimeter, the viscosity of the 30 weight % slurry was 110 cps at 20° C.

Example 2

The Kubota Tower Mill (a compact wet-pulverizer KM-5, Kubota, Co., Ltd.; Japan) was fitted with a classifier which restricted the passage of particles in excess of 20 µm. This mill was charged with 105 kg of water and heated with steam to heat the water to 90° C. Then, the mill was further continuously charged with 35 kg of coarse light burned magnesia with a maximum grain diameter of not more than 10 mm and 350 g of sodium hydroxide and the wet-pulverization and hydration were carried out. The above-mentioned mill had a tower diameter of 440 mm and a tower height of 830 mm. The particles in excess of 20 µm as size-selected by Said classifier were recycled to the wet-pulverizer. The wet-pulverization was performed at a screw speed of 85 rpm, using 350 kg of iron balls (20 mm in diameter) as the crushing medium.

The wet-pulverizer was operated for 40 minutes. The resultant slurry was ripened at 85° C. for 1 hour, after which it was cooled to provide a magnesium hydroxide slurry.

This slurry showed a hydration rate of 98% or substantially complete hydration and contained magnesium hydroxide particles with a mean diameter of 14 µm and a particle size distribution of 5 to 20 µm. Observation of the slurry particles with a microscope revealed aggregates of fine particles sized about 5 µm. As measured with a B-type viscosimeter, the viscosity of the 30 weight % slurry was 100 cps at 20° C.

In order to investigate the wet-pulverizing efficiency by the above wet-pulverizing apparatus, wet-pulverization was carried out in the same manner as the above procedures except that the wet-pulverizer was operated for 2 hours. The resultant slurry contained particles having a mean diameter of 1.5 µm and a particle size distribution of 0.7 to 3.3 µm.

Comparative Example 1

Using the same compact kneader as used in Example 1, wet-pulverization was carried out without addition of sodium hydroxide and heating in otherwise the same manner as Example 1. By this wet-pulverization, the temperature was increased to an ultimate level of 60° C. The resultant slurry showed a hydration rate of 40% and contained particles with a mean diameter of 30 µm.

Comparative Example 2

Using the same wet-pulverizing apparatus as used in Example 2, wet-pulverization was carried out without addition of sodium hydroxide and heating in otherwise the same manner as Example 2. The resultant slurry showed a hydration rate of 45% and contained particles with a mean diameter of 25 µm.

Comparative Example 3

To an aqueous solution of 2.4 g sodium hydroxide in 700 g Water was added 240 g of finely divided light burned magnesia with particle diameters in the range of 5 to 30 μm and the mixture was stirred at an elevated temperature of 90° C. for 3 hours for hydration. After completion of the reaction, the reaction mixture was cooled to provide a magnesium hydroxide slurry.

The resultant slurry showed a hydration rate of 97% or substantially complete hydration and contained magnesium hydroxide particles with a mean diameter of about 10 μm and a particle size distribution of 1 to 40 μm. As measured with a B-type viscosimeter, the viscosity of the 30 weight % slurry was 380 cps at 20° C.

What is claimed is:

1. A process for producing magnesium hydroxide comprising (i) hydrating coarse particles of light burned magnesia having a mean diameter of at least about 0.5 mm and a maximum diameter of not larger than 10 mm and (ii) conducting a wet-pulverization treatment concurrently or subsequently to step (i), wherein step (ii) is conducted in the presence of an alkaline aqueous medium at a temperature of not less than 70° C. to produce magnesium hydroxide particles having a mean particle size of about 10 to 25 μm.

2. The process for producing magnesium hydroxide according to claim 1 further comprising wet-pulverizing light burned magnesia and hydrating the same in the presence of an alkaline aqueous medium at pH not less than 11 and a temperature of 85° to 120° C.

3. The process for producing magnesium hydroxide according to claim 1 wherein the light burned magnesia is added to an aqueous alkaline medium at a temperature of not less than 70° C.

4. The process for producing magnesium hydroxide according to claim 1 further comprising subjecting light burned magnesia continuously to hydration and wet-pulverization to obtain a pulverizate, classifying the pulverizate into fine particles having a particle size of not more than 20 μm and coarse particles having a particle size of 20 μm or more and recycling the coarse particles to the hydration and wet-pulverizing treatment.

5. The process for producing magnesium hydroxide according to claim 4 further comprising subjecting light magnesia to hydration and wet-pulverization, classifying and screening the wet-pulverizate into fine and coarse particles to restrict the passage of coarse particles in excess of 20 μm, and recycling the coarse particles to the hydration and wet-pulverizing treatment.

6. The process for producing magnesium hydroxide according to claim 1 wherein the light burned magnesia is pulverized in 100 to 400 parts by weight of water per 100 parts by weight of the light burned magnesia.

7. The process for producing magnesium hydroxide according to claim 1 wherein said alkaline aqueous medium is an aqueous solution of alkali metal hydroxide.

8. The process for producing magnesium hydroxide according to claim 1 wherein an alkali metal hydroxide is present in the alkaline aqueous medium and is used in a proportion of 0.75 to 1.25 parts by weight per 100 parts by weight of light burned magnesia.

9. The process for producing magnesium hydroxide according to claim 1 further comprising ripening the hydration product.

10. The process for producing magnesium hydroxide according to claim 1, which comprises hydrating light burned magnesia while conducting the wet-pulverization treatment in the presence of an alkaline aqueous medium at a temperature of not less than 70° C. to produce a magnesium hydroxide slurry having a viscosity of not more than 200 cps at a concentration of 30 weight %.

11. The process for producing magnesium hydroxide according to claim 1 further comprising comminuting coarse light burned magnesia continuously in the wet state with a wet-pulverizer in the presence of an aqueous alkali metal hydroxide solution with a pH value of not less than 11 at a temperature of 85° to 120° C., classifying the resultant pulverizate into fine particles having a particle size of not more than 20 μm and coarse particles having a particle size of at least 20 μm or more with a classifying means, recycling said coarse particles to said wet-pulverizer and ripening the slurry formed by the hydration to provide a magnesium hydroxide slurry having a viscosity of not more than 200 cps at a concentration of 30 weight %.

12. The method according to claim 1 wherein the light burned magnesia is obtained by calcining naturally-occurring magnesite a temperature of about 550° C. to 1500° C.

* * * * *